United States Patent [19]
Toler

[11] Patent Number: 5,726,731
[45] Date of Patent: Mar. 10, 1998

[54] SHOOTER'S EYEGLASSES AND METHOD THEREFOR

[76] Inventor: Alan G. Toler, 3026 West Cary St., Richmond, Va. 23221

[21] Appl. No.: 648,732

[22] Filed: May 16, 1996

[51] Int. Cl.⁶ .................................. G02C 7/00; G02C 9/00
[52] U.S. Cl. .......................... 351/53; 351/47; 206/316.1
[58] Field of Search ................................ 351/53, 44, 45, 351/46, 47; 206/316.1

[56] References Cited

U.S. PATENT DOCUMENTS

| | | | |
|---|---|---|---|
| 935,756 | 10/1909 | Guilford | 351/53 |
| 4,761,196 | 8/1988 | Brown et al. | 351/53 |
| 5,432,568 | 7/1995 | Betz et al. | 351/53 |

*Primary Examiner*—Huy Mai
*Attorney, Agent, or Firm*—Norman B. Rainer

[57] ABSTRACT

A specialized lens powered to an eighth diopter with zero tolerance is incorporated into eyeglasses that improve a shooter's ability to sight a weapon upon a target. The lens is further tinted to enhance visual perception of the target, and is positioned such that the optical center coincides with the shooter's line of sight upon the target in a standardized shooting position. A kit which includes a set of lenses, a lens holder, and a tint selection board is provided to facilitate selection of an appropriate lens and tint.

5 Claims, 2 Drawing Sheets

SHOOTER'S EYEGLASSES AND METHOD THEREFOR

BACKGROUND OF THE INVENTION

1. Field of the Invention

This invention relates to the aiming of a shooting device having front and rear sights, and more particularly concerns eyeglasses which enhance a shooter's ability to see his sights and intended target.

2. Description of the Prior Art

In the case of firearms such as rifles and pistols, aiming is generally achieved by visually aligning a rear sight and a front sight with an intended target. To achieve such alignment, the shooter's eye must attempt to focus on all three components, namely rear sight, front sight and target. Ideally, if all three components were clearly in focus in the shooter's eye, accurate aiming is achieved.

In reality however, it is impossible for the human eye to focus simultaneously on both near objects such as a rear sight, and on a distant target object. Furthermore, focusing difficulty increases with the shooter's age. Although eyeglasses can improve the shooter's ability to focus upon an object at a specific distance, it generally worsens the ability to focus at other distances. Accordingly, if a shooter, with or without glasses, is focusing upon a distant target, his vision of his rear sight is blurred. Conversely, if the same shooter focuses upon his rear sight, then the target becomes blurred.

Many shooters, in the course of aiming will cause their eye to focus repeatedly and sequentially between rear sight, front sight and target. Such action not only causes eye fatigue, but still falls short of the ideal situation where the sights and target are simultaneously in relatively clear focus.

Standard prescription eyeglass lenses are generally powered to the quarter diopter, namely 0.25, 0.50, 0.75 and 1.00, etc. The tolerance to which said standard prescription lenses are ground is typically plus or minus an eighth diopter.

In different shooting situations, whether indoor or outdoor target shooting, or in hunting situations, lighting conditions on the target and sights will vary. In general, the shooter's ability to perceive two separately distanced objects in good visual acuity improves at higher light levels because of the natural contraction of the iris of the eye. Another visual factor which affects the shooter's ability to accurately discern a target object is the contrast of the target object scene. The contrast may be broadly defined as the ability to distinguish the outline of one object amidst contiguous background material. Although contrast is improved with increased lighting intensity, the degree of contrast may still be inadequate in certain instances, despite the level of illumination of the target region.

In different shooting positions the shooter's head may be oriented differently with respect to the line of vision through their glasses from the target to the shooter's eye. For example, if shooting a handgun in a mode wherein both hands are holding the handgun, the shooter's head and eyes are forwardly directed. However, when the handgun is held in just one hand which is extended to the side of the shooter's body, his head is turned. In such situations the line of sight through their glasses is differently positioned. For an eyeglass lens to function properly, the line of sight must pass through the optical center of the lens, and said center must be in line with the pupil of the shooter's eye.

Although some of the shooter's visual problems could possibly be resolved by a trained optometrist who would examine the shooter at the target or hunting range, such examination would be expensive.

It is accordingly an object of the present invention to provide an eyeglass lens that enhances a shooter's visual perception of his target and sights.

It is another object of this invention to provide eyeglasses that improve a shooter's ability to focus selectively upon the sights while still retaining good visual acuity of the target.

It is a further object of the present invention to provide eyeglasses of the aforesaid nature that enhance the visually perceived contrast of a target with respect to contiguous subject matter.

It is an additional object of this invention to provide a method for positioning the aforesaid eyeglass lens upon existing framed eyeglasses so that its optical center is centered on the shooter's pupil in his shooting position.

It is a still further object of the present invention to provide a method for fitting the proper eyeglass lens of the aforesaid nature required by a shooter on site at an actual shooting range.

It is yet another object of this invention to provide a kit useful in conducting the aforesaid method of lens fitting.

These objects and other objects and advantages of the invention will be apparent from the following description.

SUMMARY OF THE INVENTION

The above and other beneficial objects and advantages are accomplished in accordance with the present invention by a specialized eyeglass lens powered to an eighth diopter with zero tolerance and having a tint that enhances contrast of visually perceived contiguous subject matter. In another aspect, the present invention embraces eyeglasses for use by a shooter in a standardized shooting position. Said eyeglasses are comprised of a frame which secures at least one specialized lens of the aforesaid nature, said lens being optically contoured and physically located within said frame in a manner such that the optical center of said specialized lens is centered on the shooter's eye when the shooter is in said shooting position.

In a further aspect of the present invention a kit is provided for enabling the aforesaid specialized lens to be selected, said kit comprising: a) a graded set of lenses of eighth diopter stepwise power with zero tolerance, b) a lens holder capable of securing one or more lenses, and removably attachable to eyeglasses, and c) a multi-apertured board having mounted within said apertures transparent windows having various tints.

In the method of the present invention:

a) a shooter wearing his normal eyeglasses assumes his customary shooting position facing a standardized target under typical conditions of illumination of the target and the sights of his weapon, b) said lens holder is applied over the eyeglass lens serving the shooter's sighting eye, c) various lenses from said kit are inserted individually or in combination into said holder until the shooter is of the opinion that both the target and front sight of the weapon are in acceptable focus, and record is made of the best suited lens or lens combination selected from the kit, d) the shooter then looks at his target through the various tinted windows in said board, and records the particular tint that provides greatest visual contrast of the target, e) the shooter then aims his weapon into a mirror in his standard shooting stance and places an erasable mark on said normal eyeglass lens to mark the location where the line of sight, determined by the alignment of the sights of the weapon with the shooter's eye, passes through said normal eyeglass lens, and f) the shooter then conveys the aforesaid information concerning the selected specialized lens, tint and line of sight location to an eye care professional such as an optometrist who will prepare eyeglasses for the shooter's use in accordance with the aforesaid criteria.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 1:
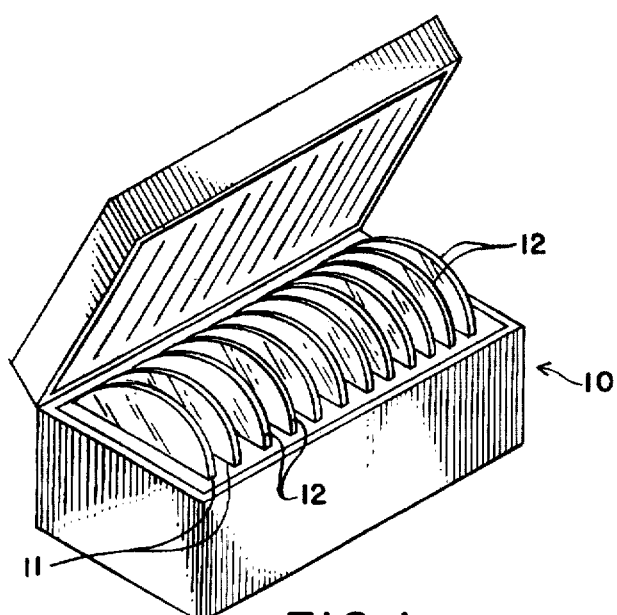
FIG. 1 is a perspective view of a graded set of lenses in a storage case.

Referring to FIG. 1, a portable and sealable protective case 10 is shown having compartments 11 for the indexed storage of a graded sequence of specialized eighth diopter lenses 12. The lenses are manufactured to substantially zero tolerance in 1/8 diopter steps of optical power, and are sequentially arranged in case 10. The compartments are preferably formed of spaced apart panels having protective cushioning.

Figure 2:
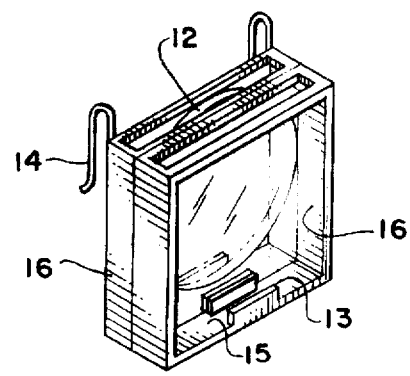
FIG. 2 is a perspective view of an embodiment of a lens holder removably attachable to eyeglasses.
Figure 3:
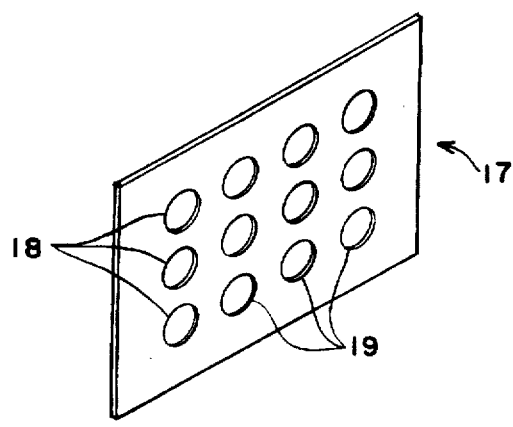
FIG. 3 is a perspective view of an embodiment of a multi-apertured board which holds transparent windows having different tints.

A lens holder 13 is provided having engaging means for removable attachment to a conventional eyeglass frame. An embodiment of such engaging means is exemplified in FIG. 2 as a pair of downwardly turned brackets 14. Said holder 13 is further comprised of support means for holding a lens 12 merely by contacting the outer edge perimeter of said lens. An embodiment of such support means is exemplified in FIG. 2 as floor panel 15 and opposed side panels 16 upwardly emergent from said floor panel. Said lens holder 13 is preferably in the form of a framework which does not obscure the lens opening of said eyeglass frame.

A tint-selecting board 17 contains an orderly array of apertures 18, said apertures containing transparent windows 19 having various tints. The specific tints are those which can be applied to an eyeglass lens, and have been found by prior experience to be beneficial in certain circumstances for increasing the visually perceived contrast of a scene. The board is of appropriate size and weight such that the shooter can hold the board up to his eye and look separately through each window in turn until he finds the tint that provides the best subjective appreciation of contrast of the target scene.

In carrying out the fitting process of this invention, the aforementioned kit of components may be utilized by a professional optometrist in testing a shooter at a shooting location that is approved and customarily used by the shooter. Alternatively, the kit may be utilized by a person trained in its use at a commercial shooting range or shooting club. The fitting process may also be carried out by the shooter himself, equipped with the aforesaid kit and extensive instructions.

The shooter will initially assume his standardized stance in relationship to the weapon 18 and target involved while wearing his usual normal eyeglasses 21, whether prescription eyeglasses or plain safety eyeglasses. The lighting conditions should also be standardized, namely the same as when the shooter does his usual practicing or actual competitive shooting. The lens holder 13 will then be emplaced upon his eyeglasses in front of his sighting eye. The shooter is then instructed to focus his vision upon the front sight of his handgun or rifle while also maintaining an acceptable view of the target. Testing may be done under various lighting conditions and at different target distances to achieve compromised multi-purpose results.

At this point of the fitting process, the shooter will usually state that either the sight or target is in sharp focus but not both at the same time. The eighth diopter lenses 12 are then removed from case 10, beginning with the lowest powered lens, and individually inserted into holder 13. With each lens, the shooter again observes the sight and target. This routine is repeated until the shooter finds that he can comfortably see both the front sight and target. This condition presumably correlates with an effective visual focal point somewhere between said front sight and target.

Once the proper lens 12 is determined, the shooter will then look directly at the target while interposing tint-selecting board 17 in his line of sight. By sequentially looking through the variously tinted windows on board 17, he will select the tint which provides the greatest subjectively perceived contrast of the target with respect to its immediate surroundings. For example, the target may be a standard competitive target having a circular black area centered on a square white sheet of stiff paper. The perceived contrast will be dependent upon the characteristic of the target, intensity and type of illumination, the shooter's eyesight, and the selected tint.

Figure 4A:
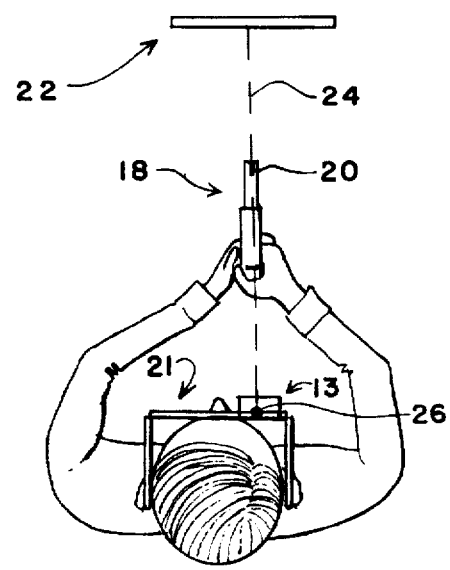
FIG. 4a is a top view of a shooter who is positioning the optical axis of his lens in a forwardly directed shooting stance.
Figure 4B:
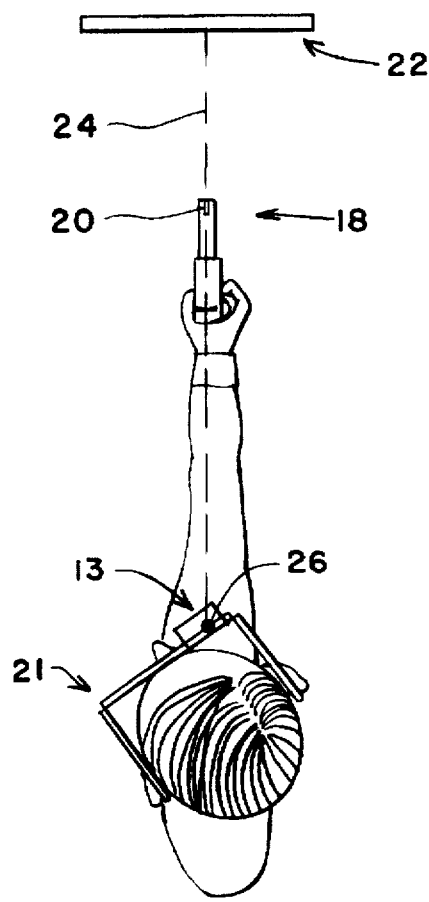
FIG. 4b is a top view of a shooter who is positioning the optical axis of his lens in a sidewardly directed shooting stance.
Figure 4C:
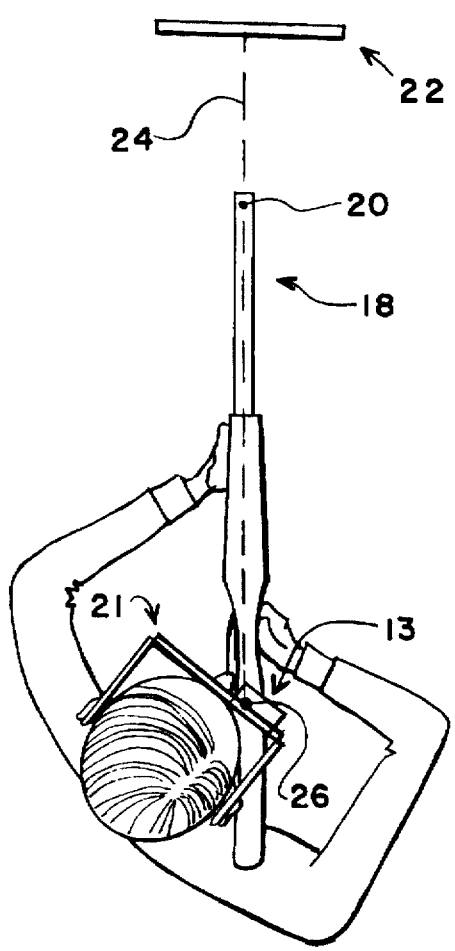
FIG. 4c is a top view of a shooter who is positioning the optical axis of his lens in a standing rifle shooting stance.

The shooter will then point his weapon toward a mirror 22, as shown in FIGS. 4a, 4b, and 4c, aiming at the center of his eye. A removable mark 26 such as by crayon or ink pen is placed upon the normal eyeglass lens where the line of sight 24 coincides with the image of his eye in mirror 22. This represents the location of the optical center for the shooter in this particular stance. In actual shooting situations, the line of sight represents the alignment of the target, the sights and the shooter's sighting eye. In different shooting positions, optical center 26 may be differently located. For example, in FIG. 4a, the center will be near the center of the lens, whereas in FIG. 4c the center 26 will be closer to the nasal corner of the lens.

The information concerning the selected lens 12, tint 19, optical center and shooter's current eyeglass prescription is conveyed to a professional optometrist who will review the information and then proceed to have a special pair of eyeglasses fabricated which incorporates the selected tint in both lenses and the proper specialized shooting lens prescription in the sighting eye lens, said lens being fabricated so as to place the optical center in the shooter-determined location. Said proper shooting prescription may occupy only a portion of the normal eyeglass lens, thereby enabling the lens to be used for other purposes, such as distance vision or close-up reading. Alternatively, the specialized shooting lens may be fabricated as a separate lens which may be removably attached to the shooter's usual eyeglasses. In such situation however, indexing means are provided for the lens and eyeglasses to permit proper positioning of the optical center.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. Shooter's eyeglasses for use by a shooter in a standardized shooting position, said eyeglasses comprising a frame, two normal lenses customarily employed for routine visual requirements, and a specialized lens powered to an eighth diopter with zero tolerance and having a tint that enhances contrast of visually perceived contiguous subject matter, said specialized lens being located within said frame in a manner such that the optical center of said specialized lens is centered on the shooter's eye when the shooter is in said shooting position.

2. The eyeglasses of claim 1 wherein said specialized lens is formed within one of said normal eyeglass lenses.

3. The eyeglasses of claim 1 wherein said specialized lens is removably associated with one of said normal lenses and further comprises indexing means for properly positioning said specialized lens.

4. A kit for enabling a shooter to select a specialized lens powered to an eighth diopter with zero tolerance and having a tint that enhances contrast of visually perceived contiguous subject matter, said kit comprising:

a) a graded set of lenses of eighth diopter stepwise power with zero tolerance, b) a lens holder capable of securing one or more of said specialized lenses and removably attachable to conventional eyeglasses, and c) a multi-apertured board having mounted within said apertures transparent windows having various tints.

5. A method for producing shooter's eyeglasses comprising:

a) instructing a shooter wearing his normal eyeglasses to assume a standardized shooting position facing a standardized target under typical conditions of illumination of the target and the sights of his weapon, b) emplacing a lens holder over the normal eyeglass lens serving the shooter's sighting eye, c) inserting various lenses from a graded set of specialized lenses powered to an eighth diopter into said holder until the shooter is of the opinion that both the target and front sight of his weapon are in acceptable focus, d) recording the best suited lens or lens combination selected from said set, e instructing the shooter to aim his weapon into a mirror in said standard shooting position and to place a removable mark on said normal eyeglass lens which serves the shooter's sighting eye to mark the location where the line of sight, determined by alignment of the sights of the weapon with the shooter's eye, passes through said normal eyeglass lens, and f reporting the aforesaid information concerning the selected specialized lens and line of sight location to an eye care professional who will prepare eyeglasses for the shooter's use in accordance with the aforesaid selected criteria.

\* \* \* \* \*